United States Patent [19]

Ninomiya et al.

[11] 4,009,975

[45] Mar. 1, 1977

[54] DEVICE FOR PRODUCING AN OBLIQUELY ORIENTED FILM OF THERMOPLASTIC SYNTHETIC RESIN

[75] Inventors: Tomokazu Ninomiya; Syuzo Sasagawa, both of Iwakuni; Hideo Washio, Odawara; Nobuhiro Hirata, Ohtake, all of Japan

[73] Assignee: Mitsui Petrochemical Industries, Ltd., Tokyo, Japan

[22] Filed: Jan. 2, 1976

[21] Appl. No.: 646,015

[30] Foreign Application Priority Data

Jan. 6, 1975 Japan .................................. 50-33

[52] U.S. Cl. .............................. 425/66; 425/72 R; 264/95; 264/209
[51] Int. Cl.² .................. B29C 17/02; B29D 23/04
[58] Field of Search .......... 425/66, 72, 327, 326 R; 264/95, 209

[56] References Cited

UNITED STATES PATENTS

| | | | |
|---|---|---|---|
| 3,280,429 | 10/1966 | Haley | 425/66 |
| 3,522,337 | 7/1970 | Ball | 425/72 X |
| 3,577,488 | 5/1971 | Bigland | 425/72 X |
| 3,661,482 | 5/1972 | Brown, Jr. | 425/66 |
| 3,752,612 | 8/1973 | Van Duuren | 425/66 |

Primary Examiner—Robert L. Spicer, Jr.
Attorney, Agent, or Firm—James E. Nilles

[57] ABSTRACT

A device for producing an obliquely oriented film of thermoplastic synthetic resin comprising an extruder, an annular die for forming the resin extruded from the extruder, a first mandrel, a second mandrel, and drawing rolls for drawing the resinous film passed over the first mandrel and then second mandrel. Said first and second mandrels are rotated in the different directions from each other.

8 Claims, 2 Drawing Figures

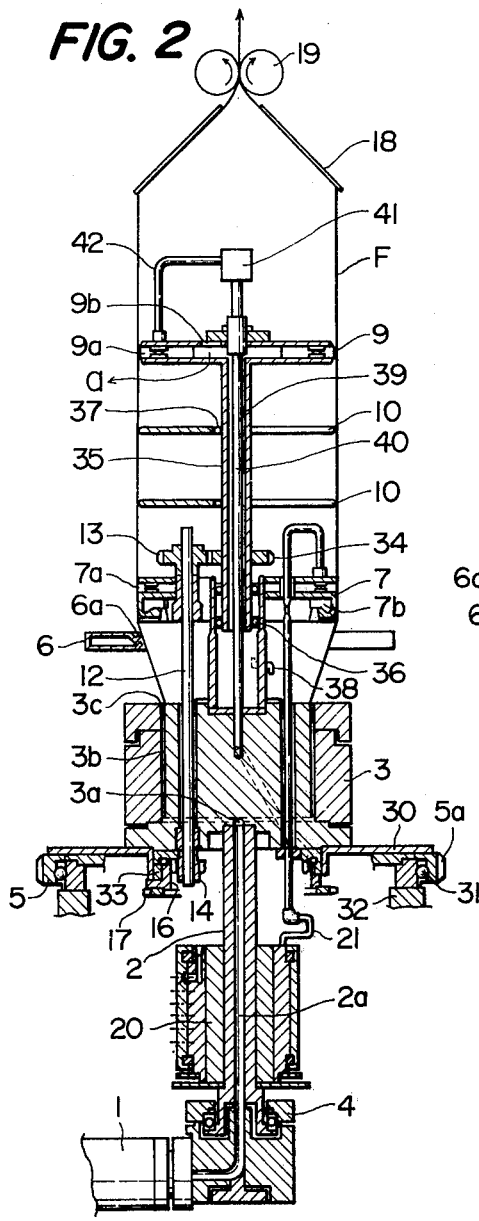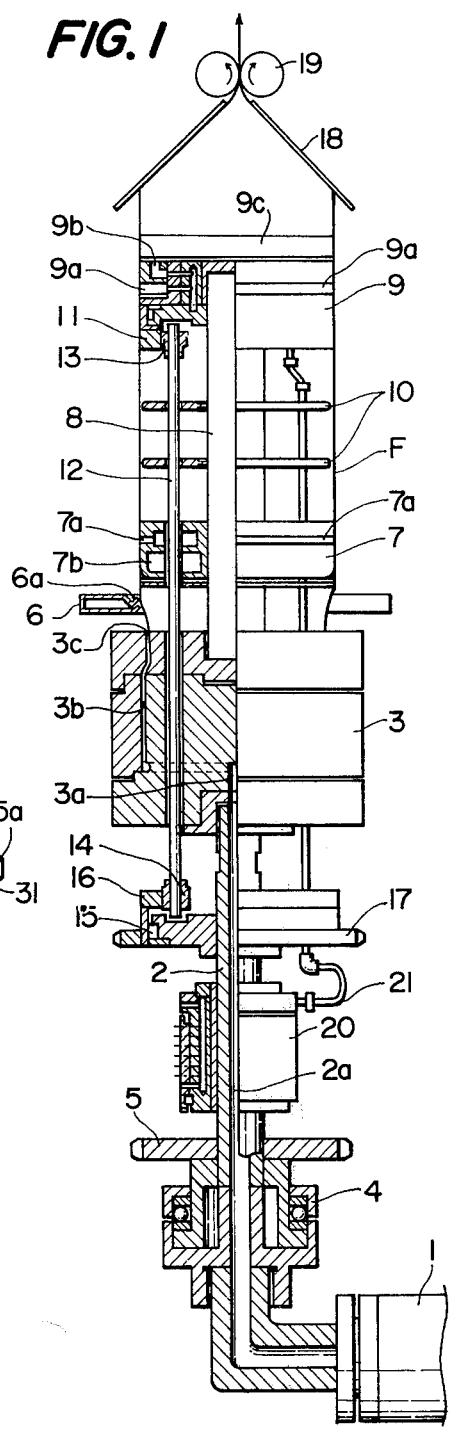

DEVICE FOR PRODUCING AN OBLIQUELY ORIENTED FILM OF THERMOPLASTIC SYNTHETIC RESIN

The present invention relates to a device for producing an obliquely oriented tubular film of thermoplastic synthetic resin wherein the tubular film of thermoplastic synthetic resin extruded from an annular die is obliquely oriented to have an increased strength in the oblique direction thereof.

There have been already proposed such devices having a fixed mandrel at the side of the annular die and a rotating mandrel at the side of drawing rolls so as to obliquely orient the tubular resin film extruded from the annular die.

However, in the case of the conventional devices having the mandrel arranged to be rotated at the side of the drawing rolls, it has been needed that the drawing rolls and a winding roll are usually rotated concentrically with the rotating mandrel. In addition, some complicated means have been needed to supply cooling water to the rotating mandrel or to provide vacuum for attracting the film.

Accordingly, a primary object of the present invention is to provide a device for producing an obliquely oriented thermoplastic resinous film capable of eliminating the above-mentioned drawbacks of the conventional devices.

Another object of the present invention is to provide a device capable of obliquely orienting the tubular resinous film without rotating in a horizontal plane the drawing rolls and the winding roll and also capable of easily accomplishing the supply of cooling water, vacuum or the like.

For the purpose of attaining these objects, it is arranged in the device of the present invention that the annular die and the first mandrel at the side of the annular die are rotated through a driving means while the second mandrel at the side of the drawing rolls is rotated through another driving means in the direction reverse to that of the first mandrel so as to compensate the twist of the tubular film relative to the drawing rolls.

According to the device of the present invention, the second mandrel is arranged to be fixed or rotated in the direction reverse to that of the first mandrel so that there is no need for usually keeping the drawing rolls and the winding roll synchronized with the rotating mandrel, namely, there is no need for providing a turntable designed to rotate in a horizontal plane the drawing rolls and the winding roll corresponding to the second mandrel, thus allowing the device to be simple and the supply of cooling water and vacuum to be easily attained.

These and other objects as well as merits of the present invention will be apparent from the following detailed description with reference to the accompanying drawing, in which:

FIG. 1 is a side view, partly sectioned, of an embodiment of the present invention; and FIG. 2 is also a side view, partly sectioned, of another embodiment of the present invention.

The thermoplastic resin extruded from an extruder 1 passes through a passage 2a provided in and along a central shaft 2 to an annular die 3 in which it passes through a central hole 3a and an annular passage 3b and is extruded through a lip 3c to form a tubular resinous film F. The central shaft 2 is secured to the annular die 3 at the upper end thereof and is supported at the lower end thereof by bearings 4 to which packing is applied so as not to escape the resin to the outside. There is fixed to the central shaft 2 near the bearings 4 a sprocket 5 which is rotated through a chain (not shown) by a sprocket (not shown) provided at the side of a motor (not shown). When the sprocket 5 is rotated, the annular die 3 is also rotated, thus causing the tubular resinous film F to be extruded through the lip 3c of the annular die 3. Adjacent to the annular die 3 is provided an air ring 6 having a ring-shaped slit 6a and after the tubular resinous film F extruded through the lip 3c of the annular die 3 is cooled by the cooling air supplied through the air ring 6, it comes to contact with a first mandrel 7, which is secured to a shaft 8 fixed to the annular die 3 and rotated in the same direction and at the same speed as those of the annular die 3. There are provided a vacuum slit 7a at the circumference of the first mandrel 7 and a chamber 7b inside the mandrel 7, through which a cooling agent is circulated. Therefore, the tubular resinous film F is attracted by the vacuum supplied through the vacuum slit 7a to closely contact with the outer circumference of the first mandrel 7 and is further cooled by the cooling agent contained in the chamber 7b. If a metal disc of copper or its alloy having a good heat conductivity is provided at the upper side of the first mandrel 7 in such a manner that the disc is closely contacted with the mandrel 7 and that the outer circumference of the disc is also contacted with the inner surface of the tubular resinous film F, the extension and cooling effect of the film F will be enhanced.

There is freely rotatably supported on the upper end of the shaft 8 a second mandrel 9 which has a vacuum slit 9a provided at the circumference thereof. Therefore, the tubular resinous film F is attracted by the vacuum supplied through the vacuum slit 9a to closely contact with the outer circumference of the second mandrel 9. Between the first and the second mandrels 7 and 9 are provided a plurality of ring-shaped plates 10 which are intended to prevent the tubular resinous film F from being loosened and which are carried by the shaft 8.

For the purpose of obliquely orienting the tubular resinous film F it is arranged that the second mandrel 9 is kept in static state or rotated in the direction reverse to those of the annular die 3 and the first mandrel 7. For this purpose there is attached integral to the second mandrel 9 a ring gear 11 with which is engaged a pinion gear 13 secured to a driving shaft 12. The driving shaft 12 extends through the ring-shaped plates 10, the first mandrel 7 and the annular die 3 and has a pinion gear 14 secured to the lower end thereof. This pinion gear 14 is engaged with a ring gear 16 carried by the shaft 2 by means of a bearing 15 and to the ring gear 16 is secured a sprocket 17 which is rotated through a chain (not shown) by a sprocket (not shown) provided at the side of a motor (not shown).

When the sprocket 17 is fixed and the other sprocket 5 is rotated, the second mandrel 9 is kept static while the annular die 3 and the first mandrel 7 are rotated. Therefore, the tubular resinous film F is twisted between the first and the second mandrels 7 and 9 and, as a result, extended in the oblique direction thereof, namely, at a certain angle relative to the axis of the mandrels. The tubular resinous film F thus obliquely oriented and then expanded by the air jetted through an air jetting nozzle 9b provided in the second mandrel 9, is drawn by the drawing rolls 19 along a guide plate 18 and deformed between the drawing rolls 19 to a sheet of resinous film to be wound up by a winding roll (not shown). It is desirable that a means 9c for coating a bonding agent is added to the second mandrel 9 so as to permit the bonding agent to be coated to the inner surface of the tubular resinous film F and the coated inner surface to be securely adhered with each other at the time when the tubular resinous film F is deformed to a sheet of film.

When the sprocket 17 is rotated in the direction reverse to that of the other sprocket 5, the second mandrel 9 is rotated in the direction reverse to those of the annular die 3 and the first mandrel 7. Therefore, the tubular resinous film F is obliquely oriented between the first and the second mandrels 7 and 9 and moved sliding on the outer surface of the second mandrel 9 to the side of the drawing rolls 19. In this case the twist of the film caused by the rotation of the die 3 is compensated by the reverse rotation of the second mandrel 9, thus making it unnecessary to rotate the drawing rolls 19 in a horizontal plane by means of, for example, a turntable.

There is provided integral to the portion of the shaft 2 located between the sprockets 5 and 17 a rotary joint 20 which is connected to a vacuum source (not shown), an air supply source (not shown) and a cooling agent supply source (not shown), respectively, while through pipes to the vacuum slits 7a and 9a, the air jetting nozzle 9b and the chamber 7b. FIG. 1 shows only the pipe 21 connecting the rotary joint 20 to the air jetting nozzle 9b. This device of the present invention is supported by a support at the die thereof.

Another embodiment of the present invention shown in FIG. 2 is a variation of the second mandrel and its driving system. In FIG. 2 same reference numerals are used to same portions as those in FIG. 1. The functional effect attained by this second embodiment shown in FIG. 2 is same as that by the embodiment shown in FIG. 1. However, the driving system for driving the annular die 3 has a supporting ring 30 connected to the underside of the die 3 in such a manner that the ring 30 can rotate integral with the die 3. The ring 30 can also rotate integral with the rotating gear 5a and is supported through bearings 31 by a support 32. The ring gear 16 comprising the driving system for the second mandrel 9 is freely rotatably carried through a bearing 33 by the supporting ring 30 and the pinion gear 13 provided at the upper end of the driving shaft 12 is engaged with a spur gear 34 which can rotate integral with a sleeve shaft 35, said sleeve shaft 35 being freely rotatably carried through a bearing 36 relative to the first mandrel 7 and secured to the second mandrel 9. Accordingly, the rotation of the pinion gear 13 which performs a planetary rotation similar to that of the embodiment in FIG. 1 is transmitted to the second mandrel 9 through the spur gear 34 and the sleeve shaft 35. If the rotation of the sprocket 17 is controlled, it will be possible that the spur gear 34 is rotated in the direction reverse to that of the first mandrel.

In the second embodiment shown in FIG. 2 the driving shaft 12 is not penetrated through the ring-shaped plates 10. Therefore, the plates 10 can be freely rotatably carried, for example, through bearings 37 by the sleeve shaft 35 to thereby allow the film F to be appropriately guided.

Air passes through a pipe 38 and a space 39 provided inside the sleeve shaft 35 to be supplied as shown by an arrow a in FIG. 2. The vacuum line reaching the vacuum slit 9a of the second mandrel 9 comprises a pipe 40 rotating integral with the annular die 3 and extending through the space 39 inside the sleeve shaft 35, and a pipe 42 being connected to the second mandrel 9 through a rotary joint 41 provided at the upper end of the pipe 40.

Other points of the second embodiment of the present invention shown in FIG. 2 are substantially same as those of the embodiment shown in FIG. 1.

It will be understood that the present invention is not limited to these embodiments shown in FIGS. 1 and 2. For example, the sleeve shaft 35 in FIG. 2 may be further extended in the lower direction to thereby enable the spur gear 34 to be arranged between the first mandrel 7 and the die 3. If so arranged, the driving shaft 12 may be not penetrated through the first mandrel 7 and the first mandrel 7 may be connected to the annular die 3 through a suitable stay. Further, it may be that the ring gear 16 is replaced by a spur gear.

What we claim is:

1. A device for producing an obliquely oriented film of thermoplastic synthetic resin comprising
    an extruder;
    an annular die for forming the resin extruded from the extruder to a tubular film, said annular die being rotated by a power source;
    a first mandrel provided at the lower side of the annular die and rotated integral with the annular die;
    a second mandrel provided at the lower side of the first mandrel, said second mandrel having an integral gear which is driven by a driving shaft extending through the annular die at the portion thereof where the center of the die is not located, said driving shaft being driven by a driving system individual to that for the annular die; and
    drawing rolls for drawing the resinous film passed over the second mandrel.

2. A device according to claim 1 wherein said gear is a ring gear provided adjacent to the circumference of the second mandrel and said driving shaft for driving the gear is engaged through a pinion with the gear provided at the upper side of the annular die.

3. A device according to claim 1 wherein said gear is provided on the rotating shaft of the second mandrel and said driving shaft for driving the gear is engaged through a pinion with the gear provided at the upper side of the annular die.

4. A device according to claim 1 wherein said first mandrel is rotated in the direction reverse to that of the second mandrel.

5. A device according to claim 1 wherein said second mandrel has a means for coating a bonding agent to the inner surface of the tubular resinous film to thereby enable the coated inner surface to be securely adhered with each other at the time when the tubular resinous film is deformed to a sheet of film.

6. A device according to claim 1 wherein a metal disc having a good heat conductivity is provided at the upper side of and adjacent to the first mandrel in such a manner that the outer circumference of the disc is contacted with the inner surface of the tubular resinous film.

7. A device according to claim 1 wherein cylindrical plates for preventing the tubular resinous film from being loosened between the first and the second mandrels are secured to the shaft by which the second mandrel is carried.

8. A device according to claim 1 wherein cylindrical plates for preventing the tubular resinous film from being loosened between the first and the second mandrels are freely rotatably carried by the rotating shaft by which the second mandrel is rotated.

* * * * *